July 7, 1936.  J. D. McKIERNAN ET AL  2,046,694
OXYGEN CUTTING APPARATUS
Filed Feb. 25, 1935   2 Sheets-Sheet 1
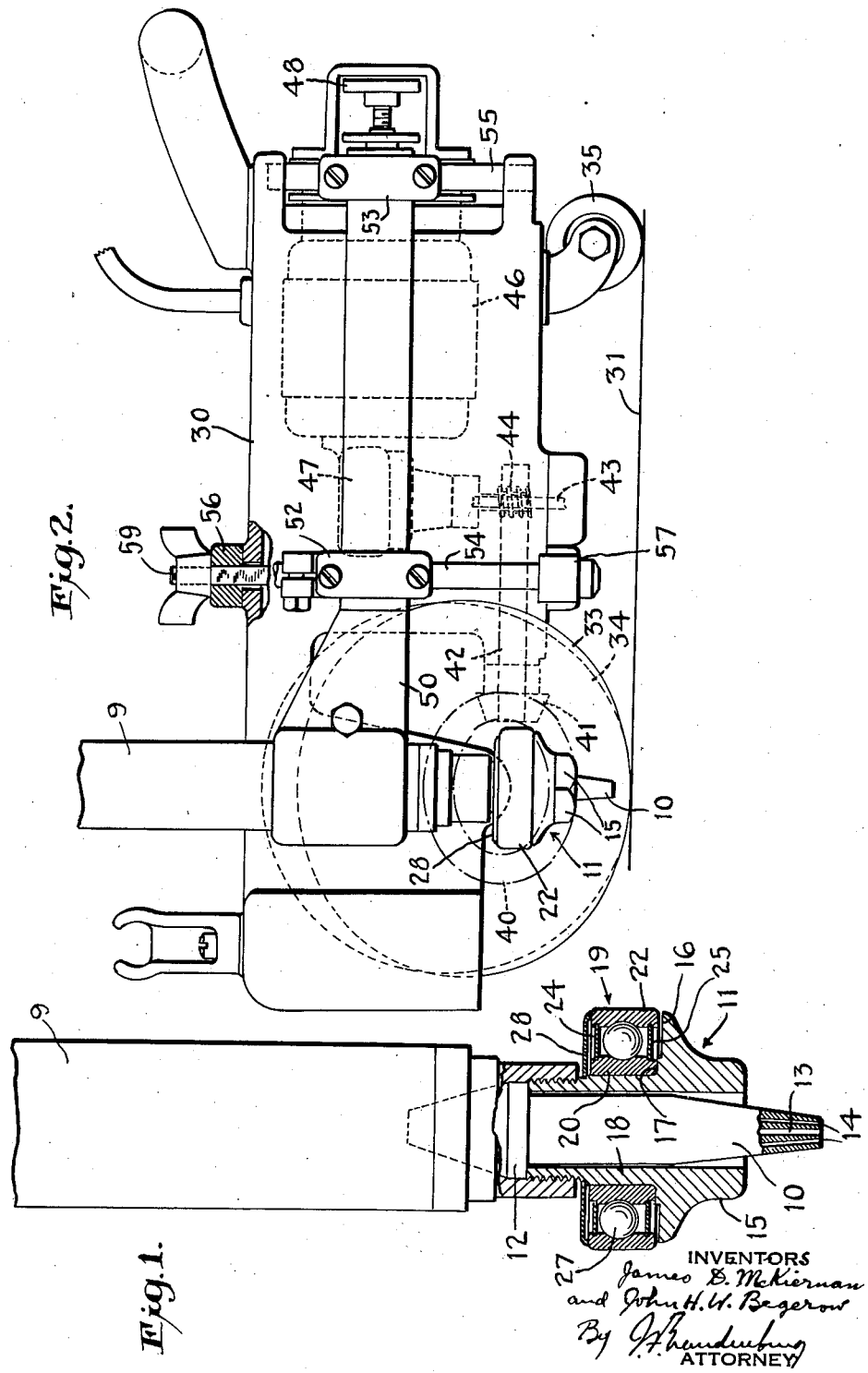
INVENTORS
James D. McKiernan
and John H. W. Begerow
By [signature]
ATTORNEY

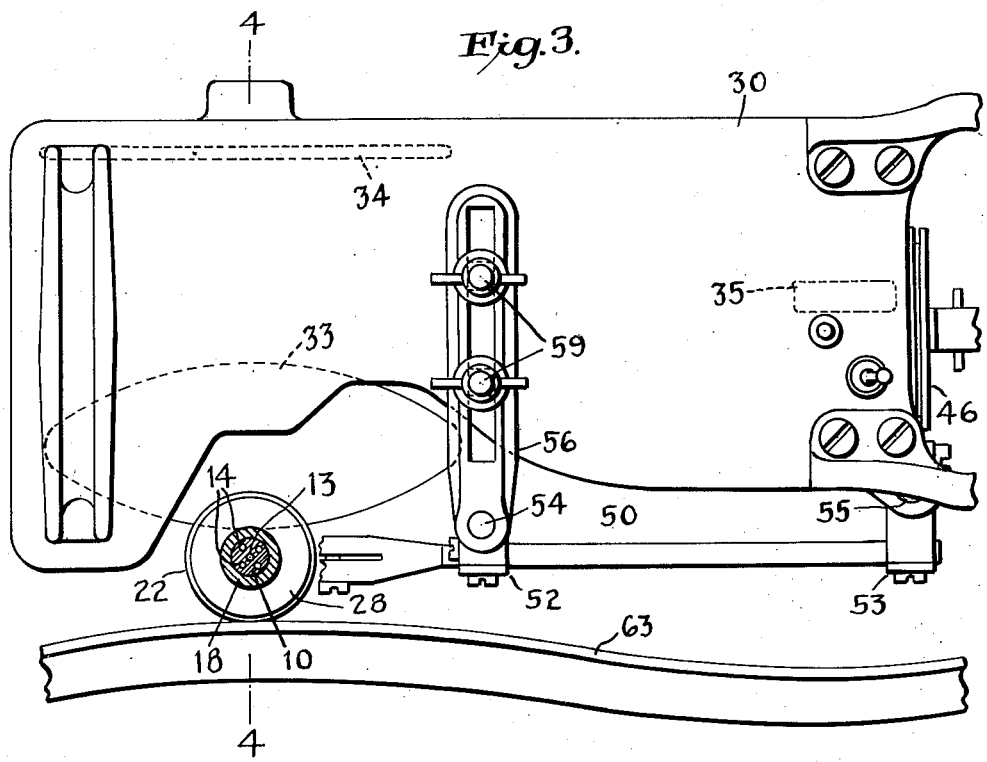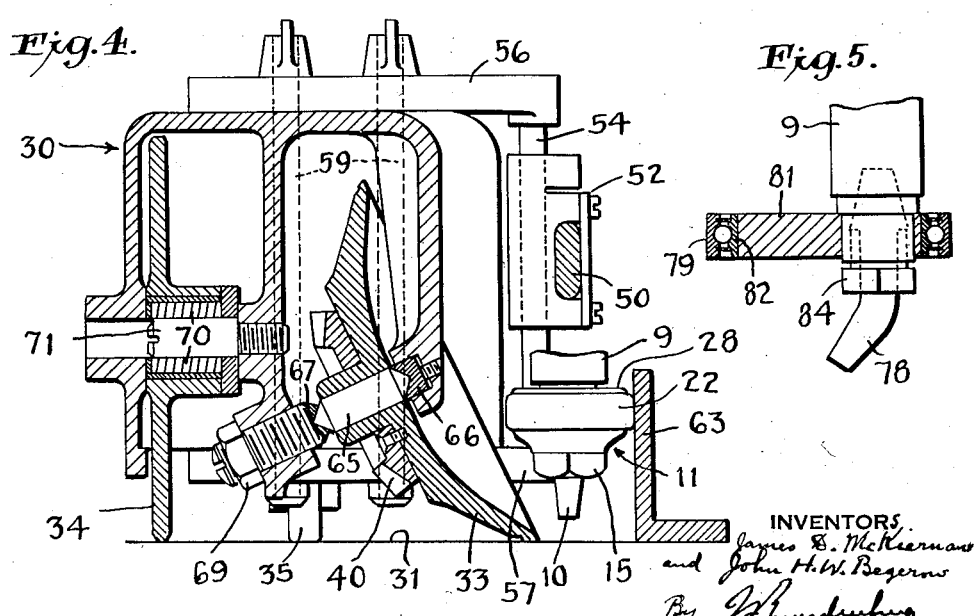

UNITED STATES PATENT OFFICE 2,046,694

OXYGEN CUTTING APPARATUS

James D. McKiernan, Brooklyn, N. Y., and John H. W. Begerow, Lyndhurst, N. J., assignors to Air Reduction Company, Incorporated, New York, N. Y., a corporation of New York Application February 25, 1935, Serial No. 8,094

8 Claims. (Cl. 266—23)

This invention relates to oxygen cutting torches and means for guiding such torches from a template.

Torch carriages which run on the surface of the work, or some adjacent supporting surface when the area of the work is small, are widely used for moving oxygen cutting torches along a predetermined path across the work. Such carriages are usually self-propelled so that they travel at a uniform or adjustable speed, and they are guided in various ways.

It is an object of this invention to provide a novel cutting torch construction which includes simple and inexpensive means for guiding the torch in accordance with the outline of a template which may embody straight or curved lines or combinations of such lines even to the extent of junctions creating obtuse angles.

Another object of the invention is to provide a torch carriage with improved means for guiding the carriage from a template. In its preferred embodiment the invention comprises a template-follower roller mounted on the torch with its axis of rotation in line with the point at which the cutting jet strikes the work. This relation of the roller and jet passage maintains the jet at a uniform distance from a template against which the roller contacts.

One feature of the invention comprises the location of the roller on the tip nut. One advantage of this feature is that the invention can be applied to existing torches by merely providing a new tip nut. Another advantage is that the roller close to the tip end of the torch can operate along inexpensive templates, such as light angles or strips clamped or fastened directly against the surface of the work. The invention combines the novel torch with a wheeled supporting carriage in such a manner that the carriage can turn freely to change its direction of travel.

Other objects, features and advantages of the invention will appear or be pointed out as the specification proceeds.

In the accompanying drawings, forming part hereof;

Fig. 1 is a fragmentary view, partly in section, of a torch embodying the invention;

Fig. 2 is a reduced side elevation, partly in section, of the torch of Fig. 1 in combination with a self-propelled carriage;

Fig. 3 is a fragmentary plan view of the structure shown in Fig. 2 with the torch in section and the roller against a template;

Fig. 4 is a sectional view along the line 4—4 of Fig. 3, with the torch broken away above the roller to show the torch holder; and Fig. 5 is a reduced fragmentary view, mostly in section, showing a modified form of the invention for making bevel cuts.

The torch shown in Fig. 1 has a body 9, constructed to receive a tip 10, which is held in position by a tip nut 11 threaded into the end of the torch body and contacting at its upper end with a shoulder 12 of the tip. The tip has a central passage 13 from which the cutting oxygen jet is delivered, and has preheating jet passages 14 around the cutting jet passage.

The tip nut 11 has flat outside faces 15 (Fig. 2) at its lower end to receive a wrench. The sides of the tip nut flare outward above the flat faces and then terminate at a shoulder 16 (Fig. 1) which has a low annular boss 17 at its inner side. The mid-portion 18 of the tip nut is cylindrical and extends upward at right angles to the shoulder 16. The upper portion of the tip nut is threaded and fits into the threaded lower end of the torch body 9.

A ball bearing 19 has an inner race 20 which fits tightly over the mid-portion 18 of the tip nut. The inner race is pressed over the mid-portion of the tip nut and into contact with the annular boss 17 which holds the ball bearing out of contact with the shoulder 16. Ball bearings of different size can be employed.

The outer race of the ball bearing extends beyond the flaring side wall of the tip nut and comprises a roller 22 for holding the torch in spaced relation to a template. The axis of the ball bearing 19 is preferably coincident with the axis of the passage 13 so that the roller 22 rotates about an axis in line with that of the cutting jet.

Annular shields 24 and 25 are pressed into grooves in the inner face of the roller 22 and extend over low shoulders on the inner race 20. These shields protect the balls 27 from foreign matter and retain the lubricant. The shields turn as a unit with the roller 22. A cover 28 fits over the tip nut just below the threads and covers the upper side of the ball bearing, except the peripheral region.

Fig. 2 shows a carriage 30 with wheels stably supporting it on the surface of the work 31. This carriage has one driving wheel 33, an idler wheel 34 which rotates about an axis in the same vertical plane with the axis of the driving wheel, and a caster wheel 35 at the rearward end of the carriage. The location of the axes of the wheels 33 and 34 in the same plane makes the carriage steer easily because it can turn about the point of traction of the driving wheel 33 or points somewhat outside of the driving wheel when the latter is rotating.

A bevel gear 40 is connected with the driving wheel 33 and meshes with a bevel pinion 41 on a shaft 42 with a worm wheel 43 which is driven by a worm 44. A motor 46 drives the worm 44 through reduction gearing 47. The motor is of the governor-controlled type and has a knob 48 for adjusting the governor to change the speed with which the carriage travels across the work.

The torch body 9 is clamped in a torch-holder 50 which is held in clamps 52 and 53. These clamps are adjustable vertically on rods 54 and 55 to regulate the spacing of the torch tip from the work. The ends of the rod 54 are held in brackets 56 and 57, which are clamped to the carriage by bolts 59 extending through slots in the brackets so that the brackets can slide transversely, when the bolts 59 are released, to regulate the spacing of the torch from the driving wheel 33. The torch-holder 50 can be moved longitudinally, when the clamps 52 and 53 are released, to bring the torch jet into the plane with the axes of the wheels 33 and 34.

Fig. 3 shows the carriage 30 traveling along a template 63 with the roller 22 in contact with the template. The carriage must be so guided by the operator that it continuously bears toward the template. A slight sidewise slipping of the driving wheel takes place but does not impair its operation. The attendant prevents the carriage from turning so far toward the template that the forward end of the carriage strikes the template, or the sidewise slipping of the driving wheel becomes excessive.

Within certain limits the care or indifference with which the attendant guides the carriage has no effect on the accuracy with which the torch follows the path determined by the template because the distance of the cutting jet from the template is always equal to the radius of roller 22 regardless of the angle between the carriage and the template. It is, of course, necessary that the attendant prevent the rearward end of the carriage from moving out so far from the template that the roller 22 is moved away from the template while the forward end of the carriage bears against the template and serves as a fulcrum, and the rearward end of the carriage must not move in so close to the template that the carriage is headed to travel away from the template. Between these limits the angular position can vary without having any effect on the accuracy of the cut.

Fig. 4 shows the wheels 33 and 34 in section. The driving wheel 33 has an axle 65 with pointed ends running in conical bearings 66 and 67. The axle 65 is inclined and the wheel 33 is dished, both of these features serving to locate the point of traction of the driving wheel close to the torch jet regardless of whether straight or bevel cuts are being made so that the torch travels at substantially the same speed as the driving wheel on curves as well as on straight courses.

The bearing 66 is a block inserted in a recess in the carriage body casting, and the bearing 67 is threaded through the carriage body casting to provide for bearing adjustment, and is held in any set position by a lock-nut 69. The wheel 34 turns on roller bearings 70 on an axle 71.

The template 63 is an angle section and may be clamped or otherwise secured directly to the work 31. One of the advantages of locating the roller 22 on the tip nut is that the roller is in position to contact with a template made from a standard angle or other section of small size, which is inexpensive and not difficult to bend to the desired contour, and which can be clamped directly on the surface of the work.

Fig. 5 shows the invention applied to a torch having a tip 78 for making bevel cuts. A template-follower roller 79 is similar in construction to the roller 19 though larger in proportion to the diameter of the torch. The axis of rotation of the roller 79 is substantially in line with the point at which the cutting jet from the tip 78 strikes the work, and this point is not in line with the axis of the torch body in the case of the bevel-cutting torch. An eccentric bushing 81 is secured on the lower end of the torch body 9, and the inner race 82 of the roller 79 fits tightly over this bushing. When the tip 78 is clamped in position by the tip nut 84, the end of the tip should be approximately in line with the axis of the roller. Relative angular movement of the eccentric bushing and tip would destroy this relation, and it is therefore desirable to mount the bushing on the torch body instead of on the tip nut which must rotate when clamping the tip in place.

Although the carriage illustrated is particularly well suited to this invention, it will be understood that the invention is not limited to combinations including such a carriage, that the carriage need not be stable or self-propelling, and that features of the invention applicable to torches can be used without any carriage. Modifications of the preferred embodiment may be made without departing from the invention as defined in the claims.

We claim:

1. The combination of a self-propelled torch carriage having wheels for stably supporting it on the surface of the work, a cutting torch, connecting means securing the cutting torch in fixed relation to the carriage in position to direct an oxygen cutting jet against the work, an idler roller having its axis in line with that of the cutting jet, and means holding the roller in fixed relation to the torch and carriage in position to keep the torch and carriage in uniform spaced relation to a template.

2. Cutting apparatus comprising a torch-supporting carriage having one power-driven wheel and a plurality of idler wheels stably supporting the carriage for movement over the surface of the work, a torch connected with the carriage in position to direct a cutting jet against the work close to the point of traction of the power-driven wheel, and a template-follower roller surrounding the torch and rotatable about an axis in line with the axis of the cutting jet and close to said point of traction.

3. Gas cutting apparatus including a torch having a removable tip for directing an oxygen jet against the work, and a nut for holding the tip in assembled relation with the body of the torch, and a roller on the tip nut rotatable on said tip nut about an axis in line with the axis of the cutting jet.

4. The combination with a torch having a removable tip and a nut for holding the tip in position, of a ball bearing having its inner race fitting securely around a portion of the tip nut, and its outer race extending beyond the outer edge of the tip nut and comprising a template-follower roller for holding the torch tip in spaced relation to a template, and a shield covering the space between the inner and outer races of the ball bearing.

5. The combination of a metal cutting torch having a body portion and a tip with its discharge end disposed to direct a cutting jet against the work in a direction to cut a beveled edge, a template-follower roller surrounding the torch, and an eccentric bushing mounting the roller on the body of the torch in position with the axis of rotation of the roller substantially in line with the point at which the cutting jet strikes the work.

6. The combination of a self-propelled torch carriage having wheels for stably supporting it on the surface of the work, a cutting torch secured to the carriage in position to direct an oxygen cutting jet against the work, a template-follower roller and rigid connecting means between the roller and carriage for guiding the carriage from a template, said roller being mounted in such position that it rotates about an axis substantially in line with the point at which the cutting jet strikes the work.

7. The combination with a torch for directing a jet against the work, of a ball bearing having its inner race fitting securely around a portion of the torch, and its outer race extending beyond the adjacent portion of the torch and comprising a template-follower roller for keeping the torch in spaced relation to a template.

8. Apparatus for cutting metal comprising a torch for directing an oxygen jet against the work, a bearing surface on the torch, the axis of said bearing surface being substantially in line with the point at which the cutting jet strikes the work, a roller surrounding the bearing surface and turning on said surface as a bearing, said roller extending beyond the adjacent portion of the torch and serving as means for holding the torch in a definite spaced relation to a template as the torch is moved along the template to guide its course over the work.

JAMES D. McKIERNAN.
JOHN H. W. BEGEROW.